US012689534B2

(12) United States Patent
Springer

(10) Patent No.: US 12,689,534 B2
(45) Date of Patent: Jul. 21, 2026

(54) GRAPHICAL USER INTERFACE FOR REQUESTING RECORDING OF CONFERENCE

(71) Applicant: Zoom Communications, Inc., San Jose, CA (US)

(72) Inventor: Shane Paul Springer, Oregon City, OR (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/738,749

(22) Filed: Jun. 10, 2024

(65) Prior Publication Data

US 2024/0333544 A1    Oct. 3, 2024

Related U.S. Application Data

(63) Continuation of application No. 17/945,693, filed on Sep. 15, 2022, now Pat. No. 12,177,030.

(51) Int. Cl.
*H04L 12/18* (2006.01)
*G06Q 10/1093* (2023.01)
*H04N 7/15* (2006.01)

(52) U.S. Cl.
CPC ..... *H04L 12/1818* (2013.01); *G06Q 10/1093* (2013.01); *H04L 12/1831* (2013.01); *H04N 7/15* (2013.01); *H04N 7/155* (2013.01)

(58) Field of Classification Search
CPC ............ H04L 12/1818; H04L 12/1831; G06Q 10/1095; H04N 7/15; H04N 7/155
See application file for complete search history.

(56) References Cited

U.S. PATENT DOCUMENTS

| | | | |
|---|---|---|---|
| 6,816,904 B1 | 11/2004 | Ludwig et al. | |
| 7,466,334 B1 | 12/2008 | Baba | |
| 10,768,885 B1 | 9/2020 | Fieldman | |

(Continued)

FOREIGN PATENT DOCUMENTS

EP            2533509 B1    12/2018

OTHER PUBLICATIONS

How to Automatically Record Zoom Meetings, Grain Blog, grain. com/blog/record-zoom-meetings, Rasheed Ahamed, Jun. 21, 2022, 12 pages.

(Continued)

*Primary Examiner* — Angela Widhalm De Rodriguez
(74) *Attorney, Agent, or Firm* — Young Basile Hanlon & MacFarlane, P.C.

(57) ABSTRACT

A device of a proposed participant of the video conference receives an invitation to a video conference. The device provides, via a display of the device and based on the invitation, a graphical user interface element comprising a first graphical user interface icon for accepting the invitation, a second graphical user interface icon for rejecting the invitation, and a third graphical user interface icon for requesting a recording of the video conference. The first graphical user interface icon, the second graphical user interface icon, and the third graphical user interface icon are displayed simultaneously within the graphical user interface element. The device receives receiving a selection of the third graphical user interface icon. The device transmits a signal requesting the recording in response to the selection.

20 Claims, 10 Drawing Sheets

(56)                References Cited

U.S. PATENT DOCUMENTS

| | | | | |
|---|---|---|---|---|
| 10,785,450 | B1 * | 9/2020 | Van Rensburg ....... | H04N 7/155 |
| 11,276,407 | B2 | 3/2022 | Reshef et al. | |
| 11,379,799 | B1 * | 7/2022 | Budkiewicz ....... | G06Q 10/1095 |
| 11,423,911 | B1 | 8/2022 | Fu et al. | |
| 11,558,213 | B1 | 1/2023 | McHugh et al. | |
| 11,663,824 | B1 | 5/2023 | Strader et al. | |
| 11,665,169 | B2 | 5/2023 | Viswanathan Iyer et al. | |
| 11,689,379 | B2 * | 6/2023 | Daredia ................ | G06F 16/483 |
| | | | | 709/204 |
| 12,177,030 | B2 * | 12/2024 | Springer ............ | G06Q 10/1095 |
| 2005/0180341 | A1 | 8/2005 | Nelson et al. | |
| 2014/0152757 | A1 * | 6/2014 | Malegaonkar ........ | H04L 67/535 |
| | | | | 348/14.01 |
| 2014/0161417 | A1 | 6/2014 | Kurupacheril et al. | |
| 2015/0036807 | A1 | 2/2015 | Jai | |
| 2015/0081806 | A1 | 3/2015 | Kanuturi et al. | |
| 2016/0021179 | A1 | 1/2016 | James et al. | |
| 2016/0173950 | A1 | 6/2016 | Brown, Jr. | |
| 2016/0234268 | A1 | 8/2016 | Ouyang et al. | |
| 2016/0269449 | A1 | 9/2016 | Modai et al. | |
| 2017/0185574 | A1 | 6/2017 | Fern et al. | |
| 2018/0098030 | A1 | 4/2018 | Morabia et al. | |
| 2018/0191907 | A1 | 7/2018 | Herrin et al. | |
| 2019/0042908 | A1 | 2/2019 | Garcia | |
| 2019/0082214 | A1 | 3/2019 | Kim et al. | |
| 2019/0341050 | A1 | 11/2019 | Diamant et al. | |
| 2020/0057866 | A1 | 2/2020 | Levy et al. | |
| 2020/0349953 | A1 | 11/2020 | Qin et al. | |
| 2020/0403817 | A1 | 12/2020 | Daredia et al. | |
| 2022/0147098 | A1 | 5/2022 | Stewart et al. | |
| 2022/0157058 | A1 | 5/2022 | Raethke et al. | |
| 2022/0210342 | A1 | 6/2022 | Stickane | |
| 2022/0277733 | A1 | 9/2022 | Totzke | |
| 2022/0327494 | A1 * | 10/2022 | Deole ................. | H04L 12/1818 |
| 2023/0260516 | A1 * | 8/2023 | Kukde ................... | H04N 7/155 |
| | | | | 704/235 |
| 2024/0013158 | A1 * | 1/2024 | Zahavi .............. | G06Q 10/1095 |

OTHER PUBLICATIONS

How to set Microsoft Teams to automatically record meetings, Business Tech Planet, businesstechplanet.com/how-to-set-microsoft-teams-to-automatically-record-meetings/, Aug. 20, 2022, 8 pages.
International Search Report and Written Opinion mailed on Jan. 3, 2024 in corresponding PCT Application No. PCT/US2023/032073.

* cited by examiner

900

902

TRANSMIT AN INVITATION FOR A VIDEO CONFERENCE

904

RECEIVE A REQUEST FOR A RECORDING OF THE VIDEO CONFERENCE

906

GENERATE A RECORDING OF THE VIDEO CONFERENCE

908

PROVIDE A MESSAGE INDICATING THAT THE RECORDING IS AVAILABLE

1000

1002

IDENTIFY CHAPTERS IN A RECORDING OF A VIDEO CONFERENCE

1004

STORE IDENTIFIERS OF THE CHAPTERS

1006

RECEIVE A USER INPUT REQUESTING A PORTION OF THE RECORDING

1008

PROVIDE THE PORTION OF THE RECORDING

GRAPHICAL USER INTERFACE FOR REQUESTING RECORDING OF CONFERENCE

CROSS-REFERENCE TO RELATED APPLICATION

This application is a continuation of U.S. patent application Ser. No. 17/945,693, filed on Sep. 15, 2022, titled, "REQUEST-BASED CONFERENCE RECORDING PROVISION," the entire disclosure of which is incorporated herein by reference.

FIELD

This disclosure relates to requesting a recording of a video conference, for example, a video conference implemented within a Unified Communications as a Service (UCaaS) system.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
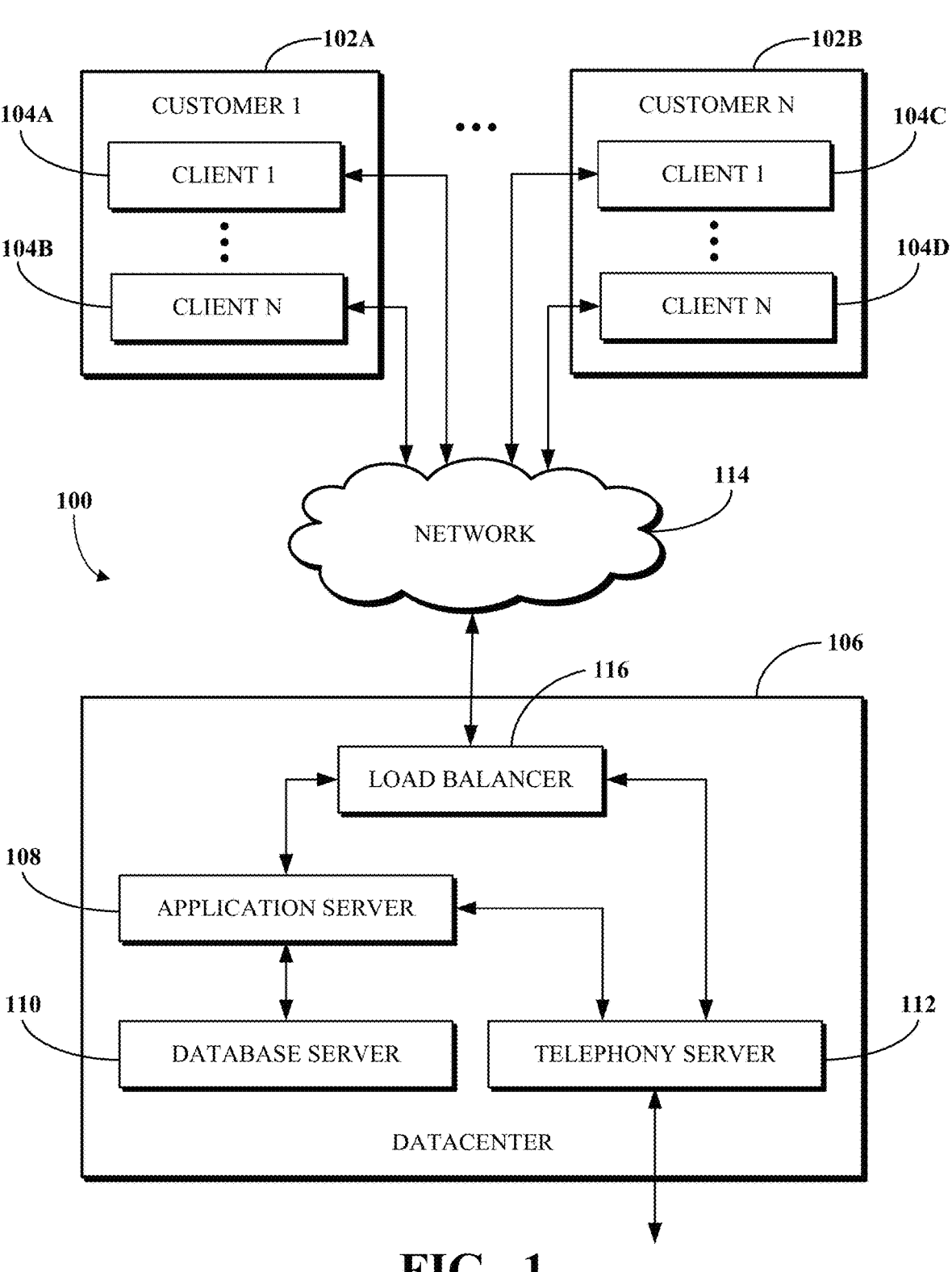
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a UCaaS, which includes several communications services integrated over a network, such as the Internet, to deliver a complete communication experience regardless of physical location.

One particular example of such a communications service, which may be implemented using a UCaaS platform or otherwise, is a conferencing service that uses conferencing software. Conferencing software is frequently used across various industries to support video-enabled conferences between participants in multiple locations. In some cases, each of the conference participants separately connect to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences in a traditional meeting experience without requiring them to be physically present with one another. Conferencing software may, in at least some cases, enable a host and/or one or more other participants to a video conference to cause a recording of the video conference to be generated.

A user of an electronic device within a UCaaS system may, over time, be invited to many different video conferences. In some cases, the user might not be able to attend a video conference to which they are invited, but might wish to view all or part of the video conference at a later time. The user may in such a case ask the host of the meeting to record the meeting and share a copy of the recording with the user at some point after the video conference concludes. However, this process may be time consuming for the host and/or the host may inadvertently forget to perform one or both of the above steps. Specifically, the host has to remember to request the recording before or during the start of the video conference, when the host may be distracted with other concerns (e.g., beginning the video conference and/or greeting the participants). Furthermore, after the recording is generated, the host may have to upload the recorded file to a file sharing service, as the file may exceed a maximum size for transmission by email. Less cumbersome techniques for recording video conferences which one cannot attend and/or identifying relevant parts of the recorded video conferences may be desirable.

Implementations of this disclosure address problems such as these using techniques for request-based conference recording provision. According to some implementations of these techniques, a server transmits an invitation to a video conference to a device of a proposed participant in the video conference. For example, the host of the video conference may specify proposed participants of the video conference, and invitations may be sent (e.g., by email or via the video conferencing software) to those proposed participants. The server receives, from the device of the proposed participant, a request for a recording of the video conference in response to the invitation. For example, a calendar invite to the video conference may include a hyperlink for indicating a request for a recording. Upon selection of the hyperlink at the device of the proposed participant, a notification that the proposed participant requested the recording is sent to the server and, in some cases, to the host of the video conference. The server accesses stored settings associated with the host of the video conference to determine whether the request may be granted. For example, the host may specify to always grant requests to record video conferences, to grant such requests for internal participants, or to grant such requests if there are at least n requesting participants (where n is a preset positive integer). Upon determining that the request is to be granted, the server generates a recording of the video conference and notifies (e.g., via a graphical interface icon) the participants, during the conference, that the recording is being generated. After the video conference is completed, a message indicating that the recording is available is provided to the device of the proposed participant. The message may include a hyperlink for viewing or downloading the recording.

After the recording is generated, a viewer of the recording may wish to view certain parts of the recording that are most relevant to themselves instead of viewing the full recording. The server may leverage a chapter identification engine, implemented using artificial intelligence technology, to subdivide a recording of a video conference into chapters, with each chapter having a start timestamp and an end timestamp. The chapters may be identified based on at least one of: an agenda of the video conference, text in presented slides (e.g., identified using optical character recognition), an identity of a speaker, words spoken by the speaker (e.g., identified using speech-to-text technology), an identity of an attendee, a recess in the video conference, or a part of a recording viewed by a viewer. The server may store identifiers of the chapters in association with the recording. The server may provide a graphical user interface for a user to provide a user input requesting a subset of the chapters. In response to the user input, the server generates a data structure (e.g., a video file or an audio file) including the subset and lacking parts of the recording that are not included in the subset.

To describe some implementations in greater detail, reference is first made to examples of hardware and software structures used to implement techniques for requesting and/or processing recordings of video conference processing. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
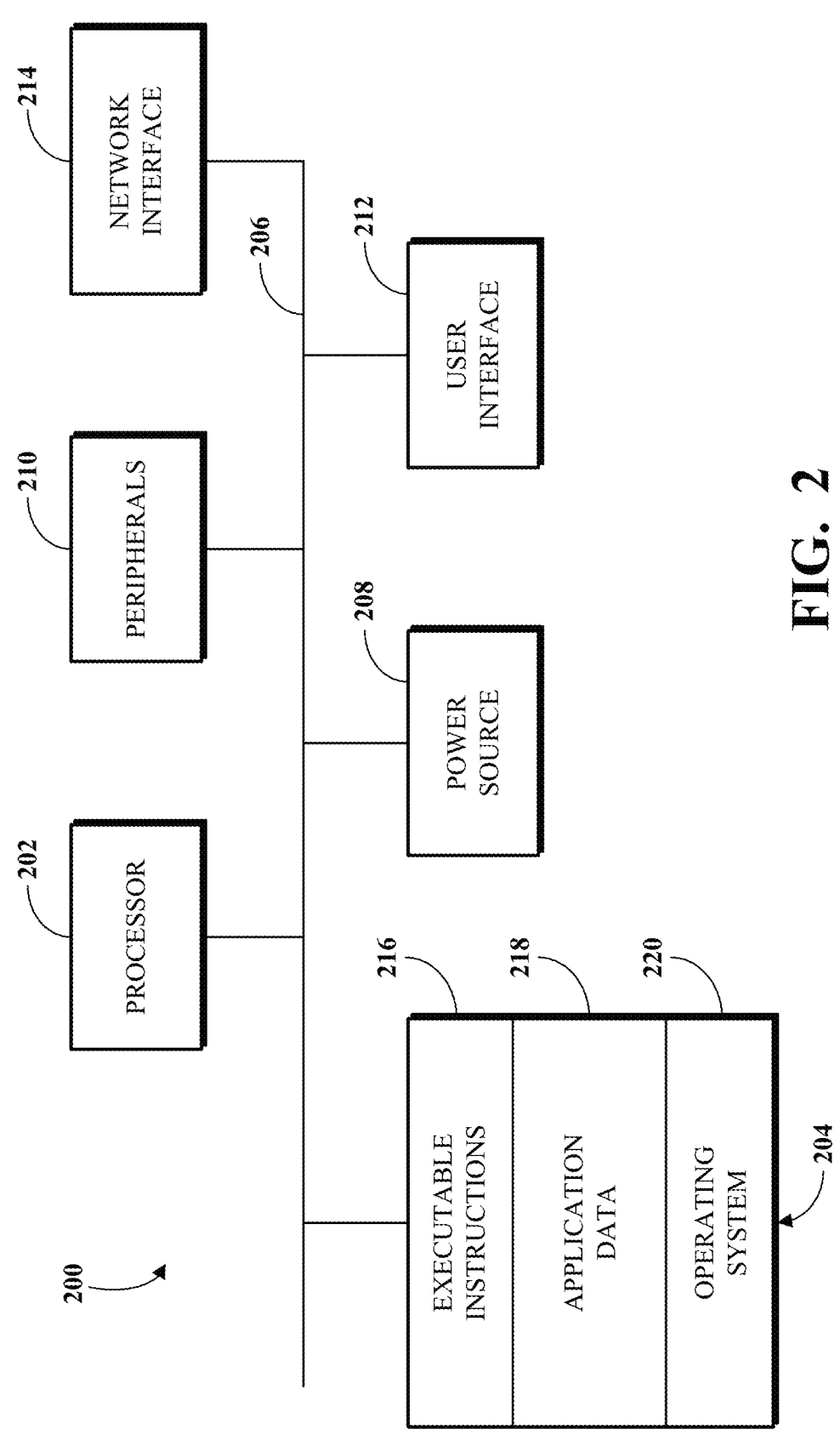
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
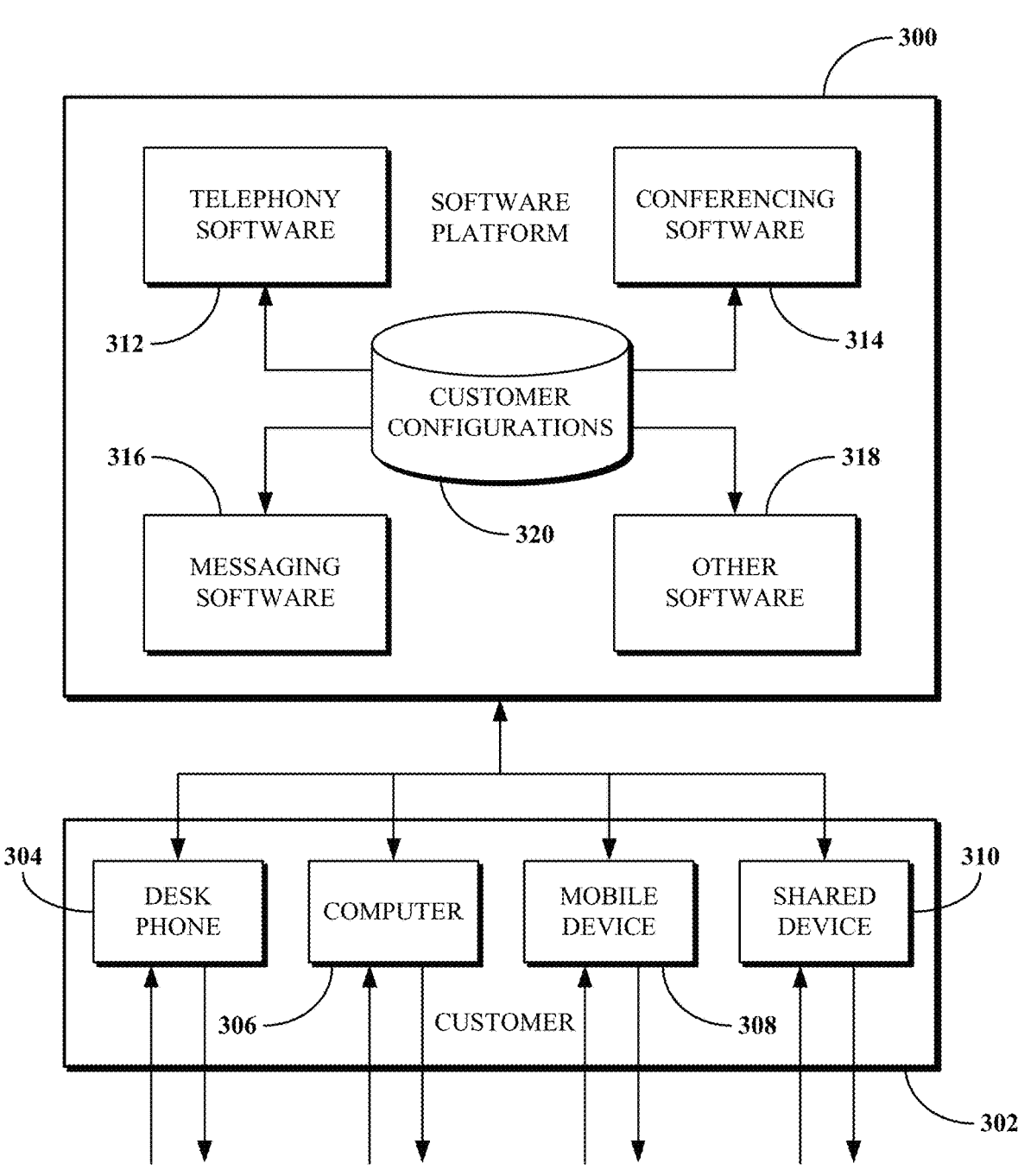
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for requesting and/or processing recordings of video conference processing.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
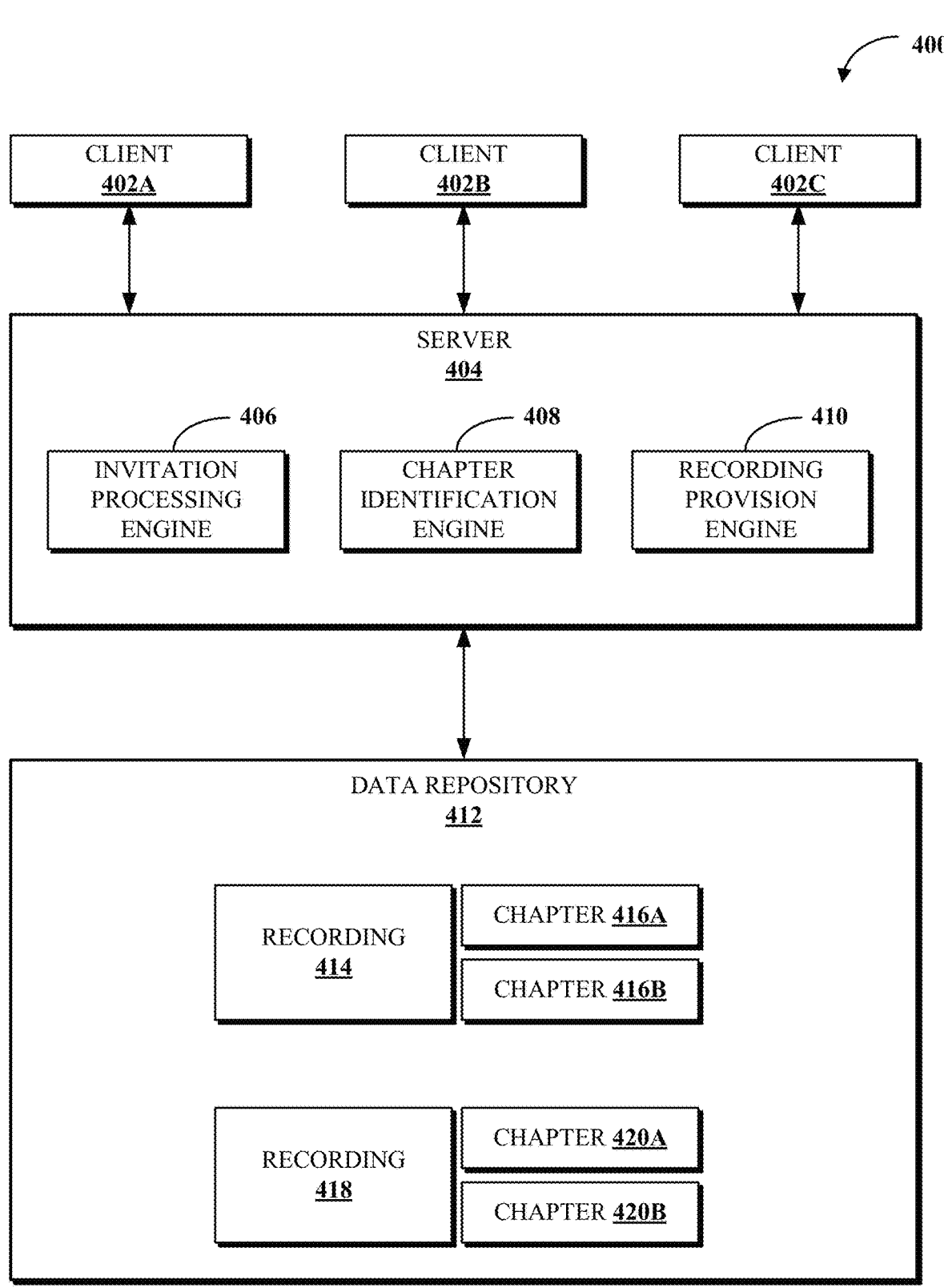
FIG. 4 is a block diagram of an example of a software platform for processing video conference recordings.

FIG. 4 is a block diagram of an example of a software platform 400 for processing video conference recordings. As shown, the software platform 400 includes clients 402A-C, and a server 404. The clients 402A-C may correspond to the clients 104A-D and/or to the clients 304-310. While three clients 402A-C are illustrated, the disclosed technology may be implemented with other numbers of clients. The server 404 may correspond to the application server 108 and/or the database server 110. As shown, the server 404 includes an invitation processing engine 406, a chapter identification engine 408, and a recording provision engine 410. The engines 406, 408, 410 may include software, hardware, or a combination of software and hardware, and operate as described below. The server 404 is coupled with a data repository 412, which may include a database or another data storage unit.

The clients 402A-C may include devices of hosts, participants, and/or proposed participants of video conferences. One client 402A may access video conferencing software to schedule a future video conference or initiate an unscheduled video conference. The video conferencing software at the client 402A may present a graphical user interface for selecting a time for the video conference and/or identifying proposed participants of the video conference. The time and the proposed participants identified at the client 402A are transmitted to the server 404 for processing by the invitation processing engine 406. The invitation processing engine 406 transmits an invitation to the video conference to the client 402B of a proposed participant. The invitation includes user interface icons (e.g., hyperlinks or buttons) for indicating whether the proposed participant plans to attend the video conference and for indicating whether the proposed participant requests a recording of the video conference. The client 402B transmits, to the server 404, the indications of whether the proposed participant plans to attend and whether the proposed participant requests the recording. If the proposed participant requests the recording, the server 404 may transmit, to the client 402A which generated the invitation, a notification that the proposed participant requested the recording and a prompt to approve or deny the recording request. If the user of the client 402A approves the recording request, a recording of the video conference may be generated and stored in the data repository 412. A copy of the recording may be provided to the client 402B that generated the request for the recording. If a recording is generated, participants in the video conference are notified that they are being recorded. The notification may be presented persistently as an icon on the screen so that the participants are aware of the recording.

After the recording is generated, the recording is stored in the data repository 412. As shown, the data repository stores a recording 414, which is divided into chapters 416A, 416B, and a recording 418, which is divided into chapters 420A, 420B. The data repository 412 is shown to store two recordings 414, 418, but may store other numbers of recordings (e.g., hundreds or thousands of recordings). While each recording 414, 418 is shown to have two chapters, stored recordings may have other numbers of chapters and some stored recordings might not be divided into chapters. The chapters 416A, 416B of the recording 414 (and, similarly, the chapters 420A, 420B of the recording 418) are identified using the chapter identification engine 408. The chapter identification engine 408 leverages artificial intelligence techniques, for example, machine learning techniques, which may include at least one of an artificial neural network (ANN), a convolutional neural network (CNN), a deep neural network (DNN), or Bayesian inference, to identify related contiguous (in time) parts of the recording 414, as described in detail below. Each contiguous part of the recording 414 may be a chapter 416A, 416B. The chapters 416A, 416B may be identified, by the chapter identification engine 408, based on any data available about the video conference in the recording 414 including, for example, a speaker identity, an agenda of the video conference, and a transcript of the video conference generated using speech-to-text technology. The chapter identification engine 408 may identify titles for the identified chapters 416A, 416B using artificial intelligence technology. For example, a quarterly report video conference could include chapters titled "opening remarks," "financial summary of the quarter," "future performance predictions," and "analyst questions." A chapter may correspond to any amount of time. For example, the opening remarks may be 10 minutes and the financial summary of the quarter may be 30 minutes. In another context, a chapter may correspond to a 10 second sound-byte or brief video (e.g., of the chief executive officer saying a memorable quote or of a participant showing their dog run after a bone).

In some cases, a user of the client 402C may access a webpage or an application for downloading or viewing recordings 414, 418 from the data repository 412. The webpage or the application may be operated, via the server 404, using the recording provision engine 410. The recording provision engine 410 may receive a search request from the client 402C and provide recordings 414, 418 from the data repository that correspond to the search request. Upon selection of one of the recordings 418, the recording provision engine presents, via the client 402C, a listing of available chapters 420A, 420B for a user of the client 402C to indicate whether they wish to view or download the full recording 418 or a subset of the chapters 420A, 420B in the recording 418. As a result, the user of the client 402C may be able to download or view only the chapters in which they are interested, thereby saving time, local computing resources at the client 402C, and/or network resources.

Figure 5:
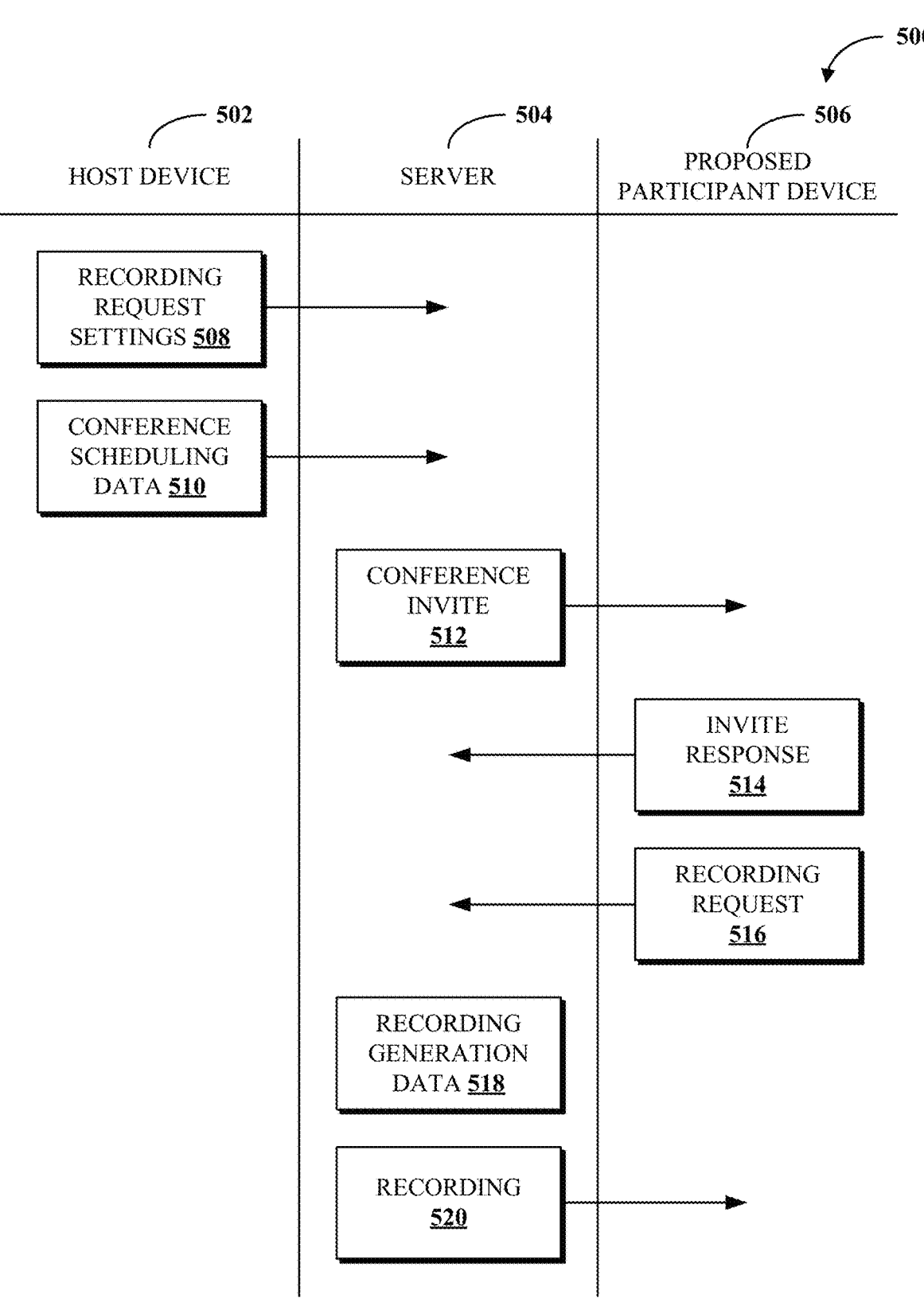
FIG. 5 is a data flow diagram of an example of requesting a recording of a video conference.

FIG. 5 is a data flow diagram 500 of an example of requesting a recording of a video conference. As shown, requesting the recording of the video conference is performed with a host device 502, a server 504, and a proposed participant device 506. The host device 502 and/or the proposed participant device 506 may correspond to one of the clients 104A-D or one of the clients 402A-C. The server 504 may correspond to at least one of the application server 108, the database server 110, or the server 404.

As shown, the host device 502 transmits recording request settings 508 to the server 504. For example, a user of the host device 502 may enter recording request settings 508 by viewing their user account via a website or an application and entering recording request settings 508 that specify other users who can request recordings of video conferences hosted by the user. For example, the user can specify that accounts associated with certain employers (e.g., identified by email address) or certain groups within an employer (e.g., the legal team of ABC Corporation) may request recordings of video conferences. In some cases, the recording request settings 508 may be specified by an administrator operating an administrator device. For example, the administrator may specify that all users who have accounts associated with email addresses in the domain of ABC Corporation may request recordings of video conferences hosted by certain users. In this case, the recording request settings 508 would be received, at the server, from an administrator device (which may be different from the host device 502).

The host device 502 also transmits conference scheduling data 510 to the server 504. The conference scheduling data 510 may specify a time for the video conference (e.g., the current time or a specified future time) and proposed participants in the video conference. For example, the user of the host device 502 may access a website or an application associated with the video conferencing service, log in to their account, and access an interface for scheduling a video conference. In that interface, the user may enter the time for the video conference (or request an instant video conference) and identifying information (e.g., email addresses or account identifiers) of the proposed participants.

Figure 7:
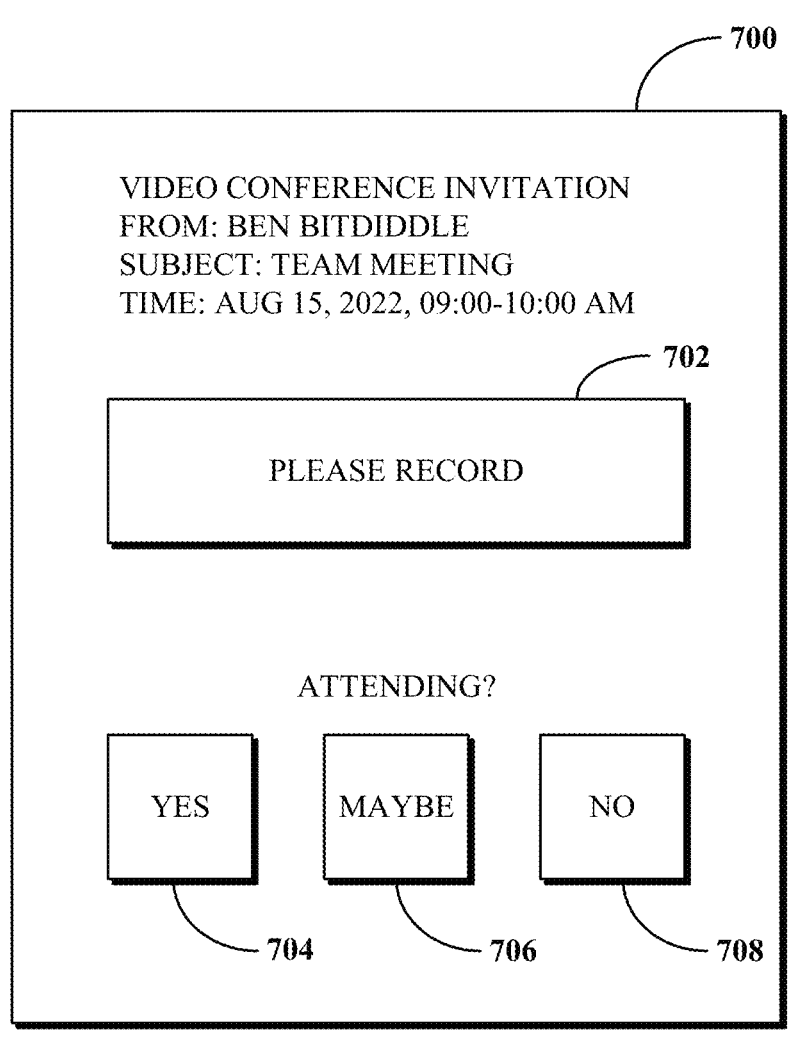
FIG. 7 is a diagram of an example of a graphical user interface for responding to a video conference invitation.

In response, the server 504 transmits a conference invite 512 to the proposed participant device 506. The conference invite 512 may include at least one of a calendar invite, an email message, or a message transmitted via the video conferencing software (and accessed via a user account of the video conferencing software associated with the proposed participant device). The conference invite 512 may be displayed at the proposed participant device 506, for example, as shown in FIG. 7 and described in detail below. The conference invite 512 may include graphical user interface (GUI) icons for indicating whether the user plans to attend the video conference (e.g., "yes," "maybe," and "no" buttons or hyperlinks) and a GUI icon for requesting a recording of the conference. As shown in FIG. 7, the GUI icons may be displayed simultaneously. The user of the proposed participant device 506 selects one of the GUI icons for indicating whether the user plans to attend the video conference to generate an invite response 514. The user of the proposed participant device selects the GUI icon for requesting the recording of the conference to generate the recording request 516. The proposed participant device 506 transmits the invite response 514 and the recording request 516 to the server 504. In some cases, the user may be unable to attend the video conference (e.g., due to a conflicting appointment) and may request a recording of the video conference so that the user may learn what happened during the video conference without having to modify their schedule.

The server 504 generates recording generation data 518 which identifies whether a recording of the video conference is to be generated. For example, the recording generation data 518 may be a Boolean variable which is true if the recording is to be generated and false otherwise. The recording generation data 518 is set to generate the recording if a recording was requested by the host device 502 or if a recording was requested by the proposed participant device 506 and the recording request settings 508 indicate that requests from the proposed participant device 506 are to be granted. Alternatively, if the proposed participant device 506 requested the recording and the recording request settings 508 do not indicate to automatically grant requests from the proposed participant device, a notification of the request may be provided to the host device 502 for manual approval by a user of the host device 502. The notification may be transmitted via email or directly through the video conferencing software (e.g., as a popup or a mobile notification).

During the video conference, the server 504 generates the recording 520. The server 504 may notify users that the recording 520 is being generated when they connect to the video conference (e.g., in a pop-up window) and, during the video conference, persistently present an icon indicating that the recording 520 is being generated. After the video conference is completed, the recording 520 may be transmitted to the proposed participant device 506 (in response to the recording request 516 and based on authorization provided in the recording request settings 508) and/or to a data repository for storage thereat.

In one example use case, a user named Alan works at XYZ Corporation. The administrator of XYZ Corporation created a rule that any employee of XYZ Corporation may request a recording of video conferences hosted by other XYZ Corporation employees. Alan invites Betsy and Cindy to attend a video conference titled "Intellectual Property Discussion" hosted by Alan on Friday at 11:00. Betsy accepts the invitation. Cindy rejects the invitation but requests a recording by pressing a "please record" button included in the invitation (e.g., as shown in FIG. 7). Betsy notifies her colleague, Debra, who works at XYZ Corporation, of the video conference with Alan. Debra accesses an internal webpage that lists video conferences of XYZ Corporation and requests a recording of Alan's meeting. As Debra works at XYZ Corporation, she is preauthorized (based on the administrator's settings) to request a recording of Alan's video conference. Thus, the server determines to generate a recording. Cindy is not an employee of XYZ Corporation. Thus, Cindy is not preauthorized to access the recording. The server transmits, to Alan's device a notification (e.g., via email or push notification) that the recording is to be generated based on Debra's request and that Cindy also requested a copy of the recording. Alan may then accept or reject a copy of the recording being provided to Cindy. Upon Alan's acceptance, the server notifies (e.g., via email or push notification) Cindy that a copy of the recording will be provided to her.

On Friday at 11:00, when Alan and Betsy join the video conference, their devices display a notification that the video conference is being recorded. During the video conference, an icon indicative of recording is persistently shown within the GUI of the video conference. After the video conference ends, the server stores a copy of the recording in a data repository and provides a link to the stored copy of the recording to an email address associated with Debra and an email address associated with Cindy. Thus, Debra and Cindy are able to view all or part of the video conference at a later time. As the recording is stored in the data repository, other user accounts who have appropriate permissions to access the data repository may later view or download the video conference. In some cases, a first set of user accounts may have permission to view the video conference and a different second set of user accounts may have permission to download the video conference. The second set of user accounts may be a subset of the first set of user accounts.

Figure 6:
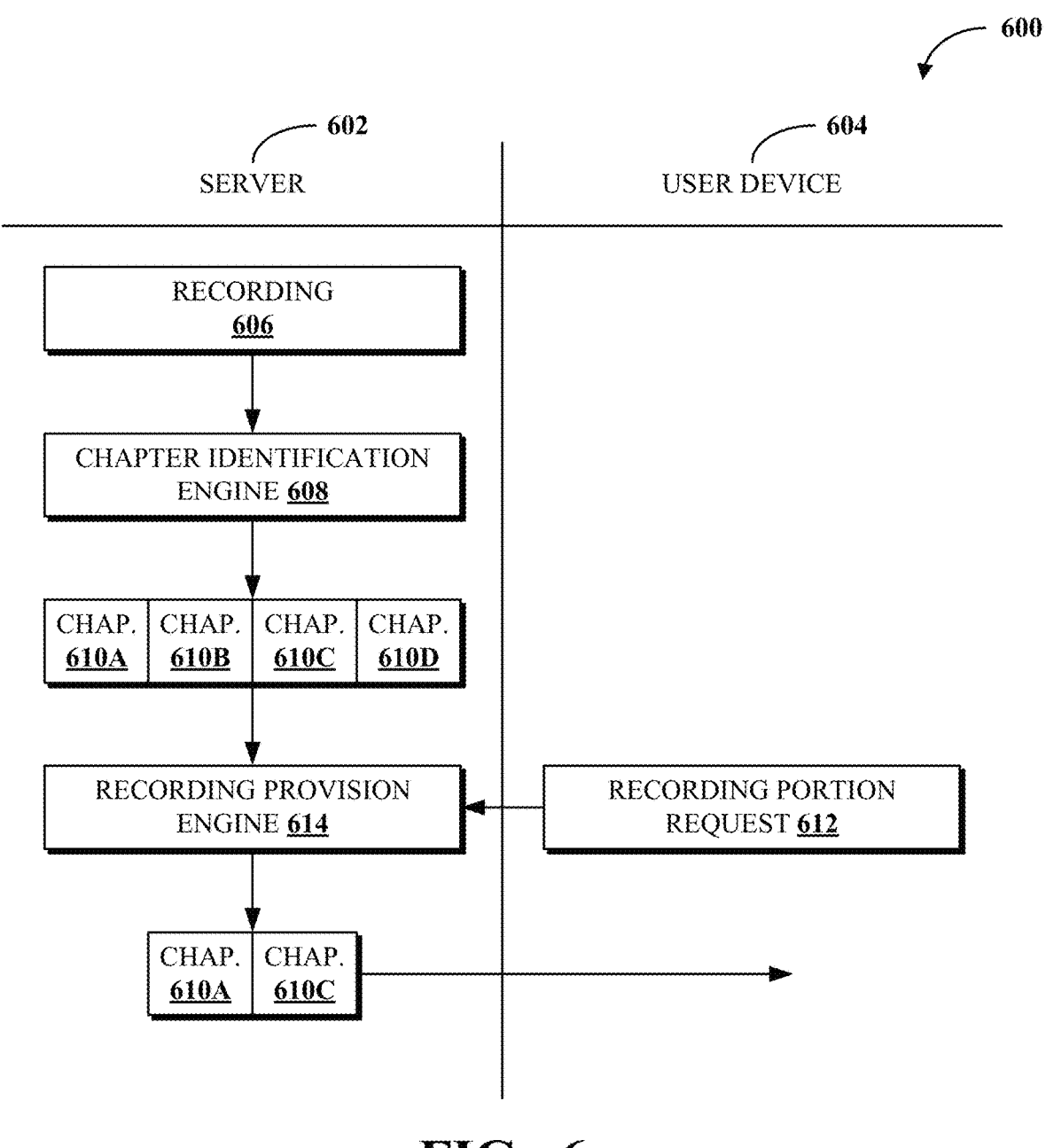
FIG. 6 is a data flow diagram of an example of accessing a portion of a recording.

FIG. 6 is a data flow diagram 600 of an example of accessing a portion of a recording. As shown, accessing the portion of the recording is performed with a server 602 and user device 604. The server 602 may correspond to the application server 108 or the database server 110. The server 602 may include the server 404 and/or the data repository 412. The user device 604 may correspond to one of the clients 104A-D or one of the clients 402A-C.

As shown, the server generates a recording 606, which may correspond to the recording 414 or the recording 418 stored in the data repository 412. The recording 606 may be a recording of a video conference or any other video recording (e.g., a recording of a child playing with a dog captured on a mobile phone). The recording 606 is provided to a chapter identification engine (e.g., corresponding to the chapter identification engine 408).

The chapter identification engine 608 leverages an artificial intelligence technique to divide the recording 606 into chapters 610A-D. Each chapter 610A-D is a time contiguous portion of the recording 606 starting at a start time and ending at an end time. The chapters may be mutually exclusive and/or collectively exhaustive. Alternatively, some timestamps of the recording 606 might not correspond to a chapter, or some timestamps of the recording may correspond to two or more chapters. For example, the chapter 610A may overlap with the chapter 610B, with the chapter 610A going from minute 0 until minute 5, and the chapter 610B going from minute 3 until minute 7.

The chapter identification engine 608 may divide the recording 606 into the chapters 610A-D based on stored metadata of the recording. The stored metadata may include at least one of: an agenda of the video conference, text in presented slides, an identity of a speaker, words spoken by the speaker, an identity of an attendee, a recess in the video conference, or a part of a recording viewed by a viewer. The chapter identification engine 608 may be trained based on portions of recordings viewed by one or more viewers and prompts, to the one or more viewers, to confirm a time in the viewed recording associated with a start timestamp or an end timestamp of a chapter. For example, if users typically view the part of the recording where a dog is shown, the chapter identification engine 608 may identify a "dog" chapter that begins when a dog starts to be shown and ends when the dog is no longer shown.

The chapter identification engine 608 may also assign titles to the chapters 610A-D. The titles may be assigned using artificial intelligence based on the above metadata. In some cases, multiple video conference recordings may include the same chapter titles. For example, multiple video conferences may begin with opening remarks and end with questions.

The artificial intelligence technique leveraged by the chapter identification engine 608 may be an ANN based technique, such as at least one of: a CNN, a DNN, supervised learning, unsupervised learning, and reinforcement learning. Alternatively, the artificial intelligence technique may be a regression technique, a support vector machine based technique, or a Bayesian technique.

Figure 8:
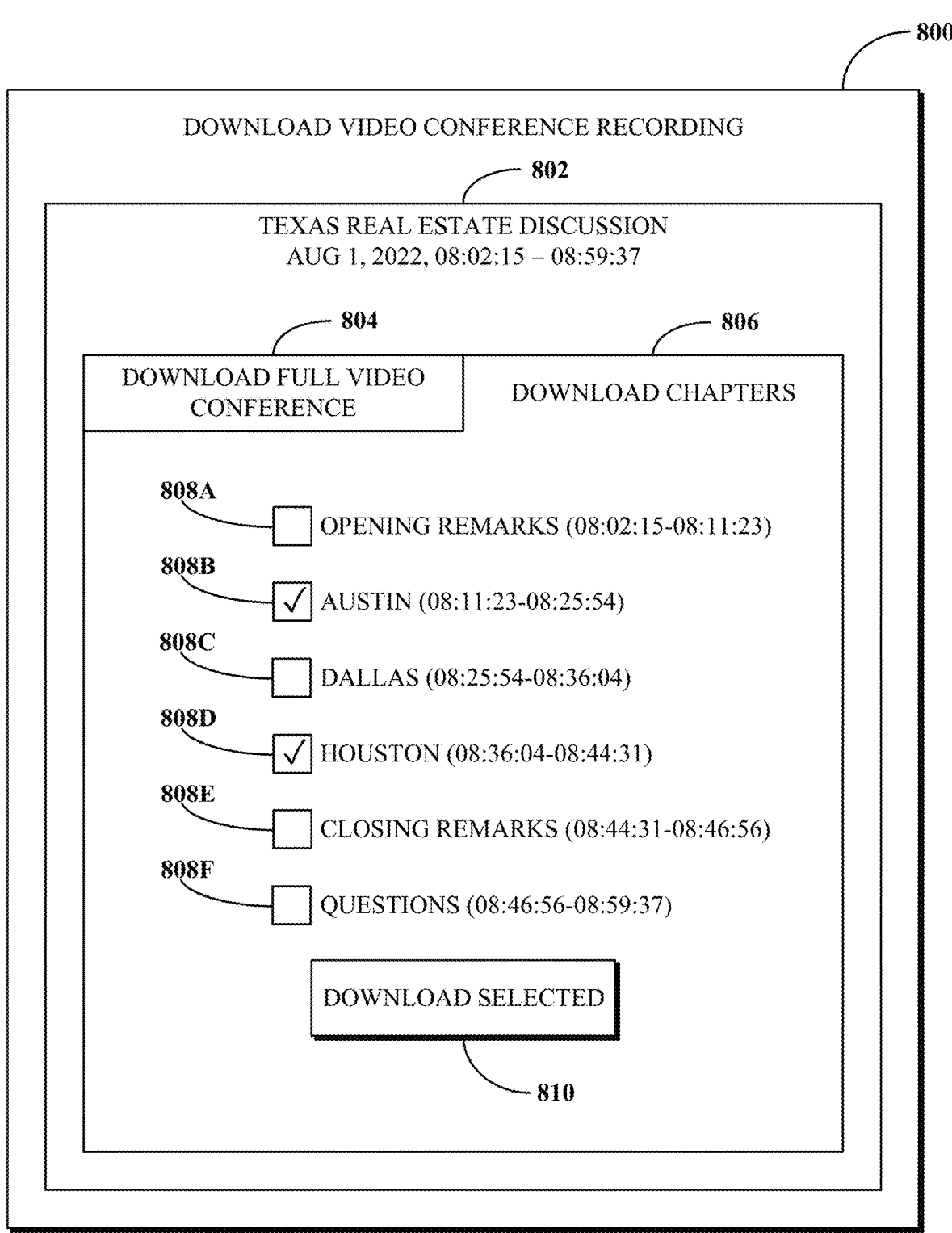
FIG. 8 is a diagram of an example of a graphical user interface for downloading a video conference recording.

As shown, the user device 604 generates a recording portion request 612 and transmits the recording portion request 612 to the server 602. The recording portion request 612 may be generated via a GUI presented at the user device 604. The GUI may list (or provide a search functionality for) available recordings to which a user account associated with the user device 604 has access. Upon selection of one of the available recordings, the GUI may present a list of available chapters for selection. The GUI may provide icons (e.g., checkboxes) for selecting one or more chapters to be included in the portion of the recording that is downloaded. An example display from the GUI is shown in FIG. 8. The selected chapters are identified in the recording portion request 612.

At the server 602, the recording portion request 612 is processed by the recording provision engine 614 (e.g., corresponding to the recording provision engine 410). The recording provision engine 614 combines the selected chapters into a single unit (or multiple units) for provision to the user device 604. As shown, the chapters 610A, 610C are included in the unit provided to the user device 604, while the chapters 610B, 610D are not included. The single unit may be a video file for downloading or a streamed video that is played within a browser or an application associated with the server 602.

FIG. 7 is a diagram of an example of a GUI 700 for responding to a video conference invitation. The GUI 700 may be presented at a client device (e.g., the client 402A, 402B, 402C or the proposed participant device 506) of a proposed participant in the video conference. As shown, the GUI includes identifying information of the video conference—"From: Ben Bitdiddle," "Subject: Team Meeting" and "Time: Aug. 15, 2022, 09:00-10:00 AM"—a "please record" button 702, and buttons 704, 706, 708 for indicating whether a user of the GUI plans to attend the video conference—including a "yes" button 704, a "maybe" button 706, and a "no" button 708. The proposed participant may select (e.g., by hovering and clicking with a mouse or touching on a touchscreen) the "please record" button 702 to request a recording of the video conference, as described herein. The proposed participant may select one of the buttons 704, 706, 708 for indicating whether they plan to attend the video conference. In alternative implementations, one or more of the buttons 702, 704, 706, 708 may be replaced with a hyperlink or another icon which, when selected, causes a response to be provided to a server (e.g., the server 404).

FIG. 8 is a diagram of an example of a GUI 800 for downloading a video conference recording. As shown, the GUI 800 includes an identifier of a recorded video conference 802 ("Texas Real Estate Discussion"). The recorded video conference may correspond to a search result or a recording selected from a set of stored recordings (e.g., residing in the data repository 412). As shown, the GUI 800 includes a tab 804 for downloading the full video conference and a tab 806 for downloading chapters from the video conference. The tab 806 is selected and the tab 804 is not selected. The tab 806 includes a list of chapters and a checkbox 808A-F for each chapter. The checkboxes 808A-F may be selected to indicate that those chapters are to be downloaded. As shown, the checkboxes 808B and 808D are selected, and the checkboxes 808A, 808C, 808E, and 808F are not selected. The user may select certain chapters for downloading if they wish to view those chapters, but not other chapters. For example, the user of the GUI 800 may be interested in downloading and viewing discussions of Austin and Houston (e.g., if the user is interested in buying or selling real estate in Austin or Houston), but not Dallas, and might not wish to download and view the opening remarks, the closing remarks, and the questions. After selecting the appropriate checkboxes 808B, 808D, the user selects a "download selected" button 810 to cause their computing device to download a video file (or, alternatively, multiple video files) including the selected chapters. As a result of the implementation of the GUI in FIG. 8 and other techniques disclosed herein, the user is able to download and/or view a video file including the discussions of Austin and Houston, but not the other parts of the video conference, thereby potentially saving the user's time (from rewinding or fast forwarding through parts of the video conference that do not interest the user) and reducing the use of limited computing resources.

In an example use case associated with FIG. 8, a real estate investor is considering selling a property in Houston and purchasing a property in Austin. A real estate brokerage with which the investor works recently conducted a video conference discussing real estate in various markets in Texas. To allow the investor to evaluate their decision, a real estate agent from the brokerage provided the investor with a link to download that video conference, which is titled "Texas Real Estate Discussion." The video conference is nearly an hour long, and the investor does not have time to watch the entire video conference, and lacks bandwidth to download the full conference. Thus, the investor selects the "Austin" and "Houston" chapters for downloading by selecting the checkboxes 808B, 808D and not selecting the other checkboxes 808A, 808C, 808E, 808F. The investor uses less bandwidth to download the two chapters, and is able to watch only the chapters in which they are interested, without having to rewind or fast forward through the recording.

Figure 9:
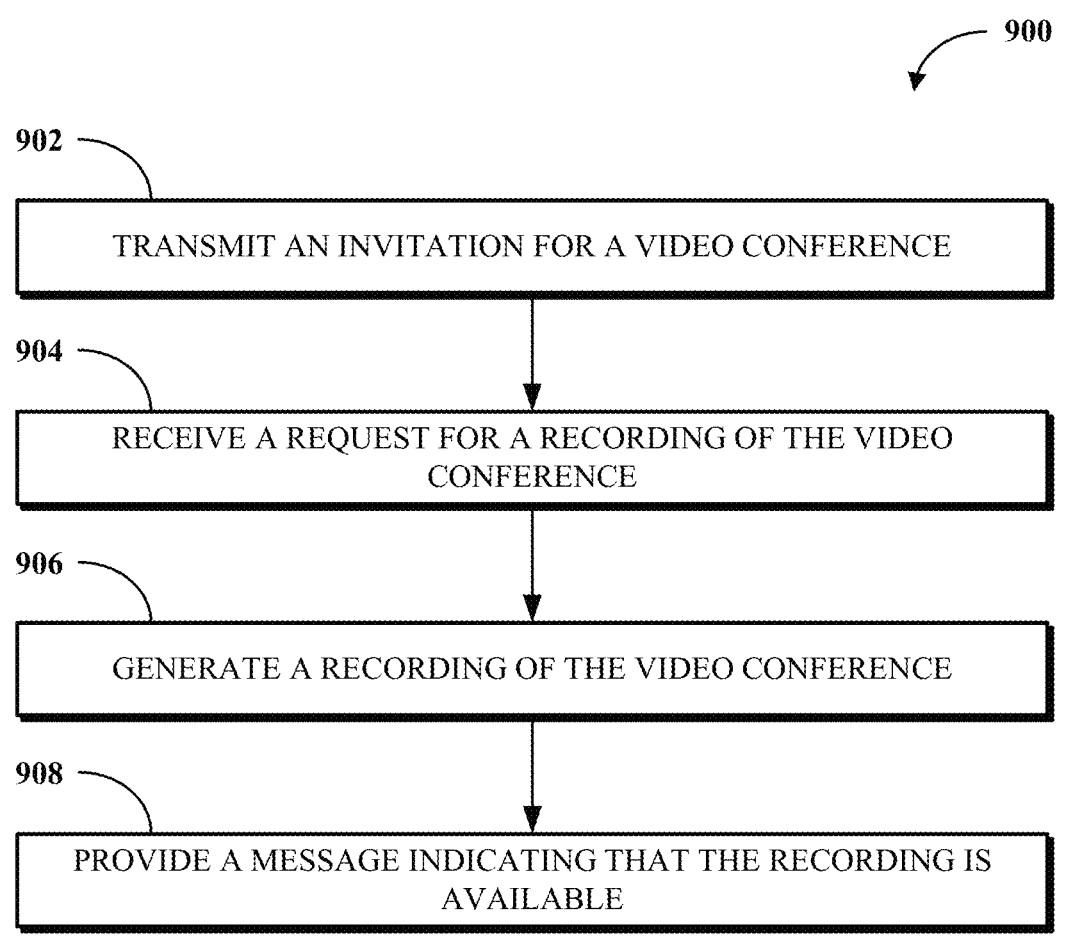
FIG. 9 is a flowchart of an example of a technique for requesting a recording of a video conference.
Figure 10:
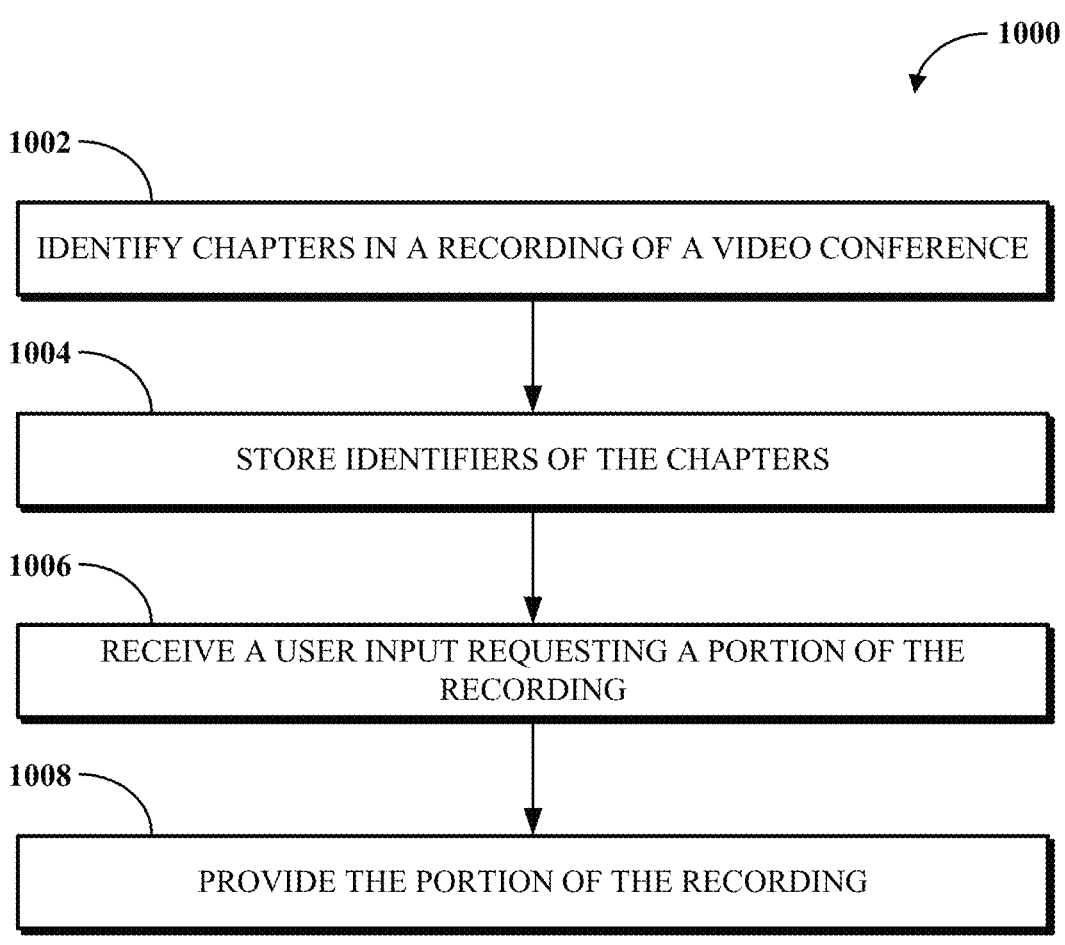
FIG. 10 is a flowchart of an example of a technique for accessing a portion of a video conference recording.

To further describe some implementations in greater detail, reference is next made to examples of techniques which may be performed by requesting and managing video conference recordings. FIG. 9 is a flowchart of an example of a technique 900 for requesting a recording of a video conference. FIG. 10 is a flowchart of an example of a technique 1000 for accessing a portion of a video conference recording. The techniques 900, 1000 can be executed using computing devices, such as the systems, hardware, and software described with respect to FIGS. 1-8. The techniques 900, 1000 can be performed, for example, by executing a machine-readable program or other computer-executable instructions, such as routines, instructions, programs, or other code. The steps, or operations, of the techniques 900, 1000 or another technique, method, process, or algorithm described in connection with the implementations disclosed herein can be implemented directly in hardware, firmware, software executed by hardware, circuitry, or a combination thereof.

For simplicity of explanation, the techniques 900, 1000 are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 9 illustrates the example of the technique 900 for requesting a recording of a video conference. The technique 900 may be performed by a server (e.g., the server 404 running the invitation processing engine 406).

At 902, the server transmits an invitation for a video conference to a device of a proposed participant of the video conference (e.g., one of the clients 402A-C). For example, a user of a host device (e.g., another one of the clients 402A-C) may access an application or a webpage for scheduling a video conference and, in response to prompts, may enter information about the video conference that is to be scheduled. The information may include at least one of a title, a time, or a proposed participant. After the information is entered, the server transmits (e.g., via email, via a video conferencing application, or via another communication application) an invitation to the conference to the device of the proposed participant. The invitation may identify at least one of the title, the time, or an identifier of the host. The invitation may cause a GUI depicting information about the conference to be presented at the device of the proposed participant, for example, as shown in FIG. 7.

At 904, the server receives, from the device of the proposed participant, a request for a recording of the video conference in response to the invitation (e.g., based on a selection of the "please record" button 702). The request may be received in conjunction with a response indicating whether the proposed participant plans to attend the video conference. In some cases, the participant may indicate that they do not plan to attend the video conference (e.g., by selecting the "no" button 708) or that they are tentative about attending the video conference (e.g., by selecting the "maybe" button 706) and may request a recording of the video conference so that they can view the video conference without being present at the time of the video conference.

As described above, the request is received from the device of the proposed participant. However, in alternative implementations, the request may be received from other devices (associated with users who were not necessarily invited to the video conference). For example, the video conferencing software may provide a page listing video conferences that are planned for the future (e.g., video conferences hosted by employees of a business may be visible to other employees of the business), and any user having access to that page may request (e.g., via a GUI icon on the page) a recording of one or more of the planned video conferences. In another example, a user may transmit, to another user, a link to a page associated with an upcoming video conference, and the other user may request a recording of the upcoming video conference via the page.

At 906, the server generates a recording of the video conference based on the request and a stored setting associated with a host of the video conference. For example, during the video conference, audio, video, and/or screen-sharing data transmitted to the server may be stored in the recording. After the recording is generated, the recording may be stored in a data repository (e.g., the data repository 412). The stored settings may be configured within a settings page of an account of the host within the video conferencing application. Alternatively, the stored settings may be configured by an administrator associated with the host (e.g., an information technology administrator associated with the employer of the host). The stored settings may indicate that certain users (e.g., all employees of a certain business, members of the legal team at a certain business, or all invitees to the video conference) are preauthorized have their recording requests granted. In some cases, the stored settings may indicate that a recording is to be generated in response to a threshold number of recording requests received from devices of proposed participants or other devices, or in response to a threshold number of request from users in a predefined group (e.g., members of the engineering team at ABC Corporation). The threshold number may be greater than or equal to two.

At 908, the server provides, to the device of the proposed participant after completion of the video conference, a message indicating that the recording is available. The message may be transmitted, via email, via push notification, and/or via the video conferencing software. The message may include a hyperlink (or another GUI icon) for viewing and/or downloading the recording from the data repository.

In some cases, the recording may be subdivided into multiple chapters (e.g., as described herein, for example, in conjunction with FIG. 6, FIG. 8, and FIG. 10). The server may identify a start timestamp and an end timestamp for each chapter using an artificial intelligence technique. In some cases, the subdivision into the multiple chapters may be done in response to at least n requests for the recording, where n is a positive integer greater than or equal to two. The artificial intelligence technique may take into account stored information associated with the users requesting the recordings. For example, if several users from the legal team requested a recording and several users from the finance team requested a recording of a video conference, the video conference is likely to include a chapter related to financial matters and a chapter related to legal matters.

The message indicating that the recording is available may be provided in real time after the recording becomes available. Alternatively, the message may be provided after the chapters are identified, based on settings associated with the recipient of the hyperlink and/or preconfigured settings of the video conferencing software (e.g., by an administrator). In some cases, a first message may be provided in real time after the recording becomes available, and a second message may be provided after the recording has been subdivided into chapters.

As the subdivision of the recording into chapters may be a computationally intensive activity, the subdivision may occur when there is low demand for computational resources (e.g., during the night or during the weekend) rather than in real time after the conference is completed. In some cases, the subdivision of the recording into chapters may occur when demand for computational resources at the server for other activities falls below a preset threshold demand level.

FIG. 10 illustrates the example of the technique 1000 for accessing a portion of a video conference recording. The technique 1000 may be performed by a server (e.g., the server 404 running the chapter identification engine 408 and the recording provision engine 410).

At 1002, the server identifies, using a chapter identification engine, multiple chapters in a recording of a video conference based on stored metadata of the recording. Each chapter is associated with a contiguous block of time in the recording. The chapter identification engine may leverage artificial intelligence or statistical techniques. To reduce latency resulting from excessive demand on computational resources, the chapter identification engine may execute during a time when there is low demand for computational resources (e.g., during the night, on weekends, or on holidays). The chapter identification engine may operate based on a feature vector that includes at least one of text or images from presented slides, identifiers of speakers, spoken words or phrases (identified by speech-to-text), or an agenda for the video conference. The stored metadata may include identifiers of users requesting the recording and not participating in the video conference. The stored metadata may include stored data related to those users. For example, if multiple users who are chemical engineers and multiple users who are medical doctors requested access to the recording, the recording likely includes a chapter related to chemical engineering and a chapter related to medicine. If multiple users who frequently view video conferences about real estate requested access to the recording, the recording likely includes a chapter related to real estate.

At 1004, the server stores identifiers of the multiple chapters in association with the recording. The identifiers may be chapter titles or other identifiers (e.g., a frame from the chapter or a slide in a presentation associated with the chapter). The identifier for each chapter may be selected using artificial intelligence or statistical techniques and based on the same feature vector that was used to identify the chapters.

At 1006, the server receives a user input requesting a portion of the recording of the video conference corresponding to a subset of the multiple chapters. For example, the server may receive, from a user device may receive and via an application or a webpage, a request to view or download a recorded video conference. The video conference may be selected from a list of recorded video conferences that are accessible via a user account associated with the user device. In response to the request, the server may cause the client to present a GUI (e.g., the GUI 800) listing available chapters in the video conference. The user of the user device may select the subset the available chapters for viewing or downloading. The subset of the available chapters corresponds to the portion of the recording.

At 1008, the server provides a data structure (e.g., a file or another data structure) associated with the portion of the recording for viewing or downloading at the user device. The user device may then view or download the data structure based on whether a user account associated with the user device has viewing permissions and/or downloading permissions for the recording. In some cases, a chapter from the recording may be automatically recommended to a user based on other users viewing or downloading that chapter. For example, in a video conference recording discussing real estate in Texas, if all of the real estate agents in an office aside from an agent named Fred have viewed a chapter titled "Austin," the server may generate a recommendation for Fred to view the chapter titled "Austin." The server may transmit the recommendation to a device associated with Fred via email, a chat application or a push notification. Fred may view or download the chapter in response to the recommendation.

In another example, the server may calculate similarity scores between user accounts based on features of the user accounts (e.g., at least one of company, department, job title, job seniority, geographic location, year of college graduation, or university degrees obtained). The server may generate recommendations for a given user account based on chapters of video conference recordings viewed by other user accounts that have a similarity score to the user account exceeding a threshold. For example, if similarity scores are ranked between 0 and 100, and multiple users with similarity scores to Fred exceeding 90 viewed the "Austin" chapter, then the "Austin" chapter may be recommended to Fred for viewing. The similarity score may be calculated using any artificial intelligence technique, for example, machine learning or a deep neural network.

Some implementations are described below as numbered examples (Example 1, 2, 3, etc.). These examples are provided as examples only and do not limit the other implementations disclosed herein.

Example 1 is a method, comprising: transmitting an invitation for a video conference to a device of a proposed participant of the video conference; receiving, from the device of the proposed participant, a request for a recording of the video conference based on the invitation; generating the recording based on the request; and providing, to the device of the proposed participant after completion of the video conference, a message indicating that the recording is available.

In Example 2, the subject matter of Example 1 includes, wherein the request is received in conjunction with declining the invitation or tentative acceptance of the invitation.

In Example 3, the subject matter of Examples 1-2 includes, wherein the request is received in conjunction with an indication that indicates whether the proposed participant plans to attend the video conference.

In Example 4, the subject matter of Examples 1-3 includes, wherein the invitation comprises a calendar invite, and wherein the request is based on a selection of a hyperlink associated with the calendar invite.

In Example 5, the subject matter of Examples 1-4 includes, wherein the recording is generated based on a stored setting associated with a host of the video conference, wherein the stored setting indicates generation of the recording in response to a threshold number of recording requests received from devices of proposed participants of the video conference.

In Example 6, the subject matter of Examples 1-5 includes, wherein the recording is generated based on a stored setting associated with a host of the video conference, wherein the stored setting indicates generation of the recording in response to receiving a request for the recording from a member of a predefined group.

In Example 7, the subject matter of Examples 1-6 includes, wherein multiple recording requests, including the request, are received, the method comprising: subdividing the generated recording into chapters; and identifying a start timestamp and an end timestamp for each chapter of the chapters using a chapter identification engine, wherein the chapter identification engine leverages an artificial intelligence technique that takes into account stored information associated with user identifiers associated with the multiple recording requests.

In Example 8, the subject matter of Examples 1-7 includes, wherein the recording is generated based on a stored setting associated with a host of the video conference, the method comprising: determining, based on the stored setting, whether the proposed participant is permitted to at least one of view the recording or download the recording, wherein the message includes a hyperlink for viewing the recording if the proposed participant is permitted to view the recording or the message includes a hyperlink for downloading the recording if the participant is permitted to download the recording.

Example 9 is a non-transitory computer readable medium storing instructions operable to cause one or more processors to perform operations comprising: transmitting an invitation for a video conference to a device of a proposed participant of the video conference; receiving, from the device of the proposed participant, a request for a recording of the video conference based on the invitation; generating the recording based on the request; and providing, to the device of the proposed participant after completion of the video conference, a message indicating that the recording is available.

In Example 10, the subject matter of Example 9 includes, wherein the request is received in conjunction with declining the invitation.

In Example 11, the subject matter of Examples 9-10 includes, wherein the request is received in conjunction with a response to the invitation indicating whether the proposed participant plans to attend the video conference.

In Example 12, the subject matter of Examples 9-11 includes, wherein the invitation comprises an email message, and wherein the request is based on a selection of a hyperlink associated with the email message.

In Example 13, the subject matter of Examples 9-12 includes, wherein the recording is generated based on a stored setting associated with a host of the video conference, wherein the stored setting indicates generation of the recording in response to n recording requests received from devices of proposed participants of the video conference, wherein n is a positive integer greater than or equal to two.

In Example 14, the subject matter of Examples 9-13 includes, wherein the recording is generated based on a stored setting associated with a host of the video conference, wherein the stored setting indicates generation of the recording in response to receiving a request for the recording from a predefined set of preauthorized user accounts.

In Example 15, the subject matter of Examples 9-14 includes, wherein multiple recording requests, including the request, are received, the operations comprising: subdividing the generated recording into chapters; and identifying a start timestamp and end timestamp for each chapter of the chapters using a chapter identification engine, wherein the chapter identification engine leverages a statistical technique that takes into account stored information associated with user identifiers associated with the multiple recording requests.

In Example 16, the subject matter of Examples 9-15 includes, wherein the recording is generated based on a stored setting associated with a host of the video conference, the operations comprising: determining, based on the stored setting, whether the proposed participant is permitted to download the recoding, wherein the message includes a hyperlink for downloading the recording if the participant is permitted to download the recording.

Example 17 is an apparatus, comprising: a memory; and a processor configured to execute instructions stored in the memory to: transmit an invitation for a video conference to a device of a proposed participant of the video conference; receive, from the device of the proposed participant, a request for a recording of the video conference based on the invitation; generate the recording based on the request; and provide, to the device of the proposed participant after completion of the video conference, a message indicating that the recording is available.

In Example 18, the subject matter of Example 17 includes, wherein the request is received in conjunction with tentative acceptance of the invitation.

In Example 19, the subject matter of Examples 17-18 includes, wherein the recording is generated based on a stored setting associated with a host of the video conference, wherein the stored setting indicates generation of the recording in response to a threshold number of recording requests.

In Example 20, the subject matter of Examples 17-19 includes, wherein the recording is generated based on a stored setting associated with a host of the video conference, wherein the stored setting comprises a preauthorization for a set of users to request video conference recordings.

Example 21 is a method, comprising: identifying, using a chapter identification engine, a plurality of chapters in a recording of a video conference based on stored metadata of the recording, wherein each chapter is associated with a start timestamp and an end timestamp; storing identifiers of the plurality of chapters in association with the recording; receiving a user input requesting a portion of the recording of the video conference corresponding to a subset of the plurality of chapters; and providing, in response to the user input, the portion of the recording of the video conference.

In Example 22, the subject matter of Example 21 includes, wherein the chapter identification engine uses artificial intelligence, wherein the chapter identification engine is trained based on portions of recordings viewed by one or more viewers and prompts, to the one or more viewers, to confirm a time in a viewed recording associated with a start timestamp or an end timestamp of a chapter.

In Example 23, the subject matter of Examples 21-22 includes, wherein the stored metadata comprises at least one of: an agenda of the video conference, text in presented slides, an identity of a speaker, words spoken by the speaker, an identity of an attendee, a recess in the video conference, or a part of a recording viewed by a viewer.

In Example 24, the subject matter of Examples 21-23 includes, wherein the stored metadata comprises identifiers of users requesting the recording and not participating in the video conference, and stored data related to the users.

In Example 25, the subject matter of Examples 21-24 includes, determining that a set of users viewed a given chapter of the plurality of chapters; and transmitting, to a device of a new user outside the set of users, a recommendation to view the given chapter based on a common feature of the new user and at least one member of the set of users.

In Example 26, the subject matter of Examples 21-25 includes, wherein providing the portion of the recording comprises providing a hyperlink to view the portion of the recording, the method further comprising: determining whether a user providing the user input has permission to download the portion of the recording; and if the user has permission to download the recording: providing a hyperlink to download the portion of the recording.

In Example 27, the subject matter of Examples 21-26 includes, wherein the chapters in the plurality of chapters are mutually exclusive and collectively exhaustive.

In Example 28, the subject matter of Examples 21-27 includes, wherein a first chapter of the plurality of chapters overlaps with a second chapter of the plurality of chapters.

In Example 29, the subject matter of Examples 21-28 includes, wherein a portion of the recording is not associated with any chapter of the plurality of chapters.

Example 30 is a non-transitory computer readable medium storing instructions operable to cause one or more processors to perform operations comprising: identifying, using a chapter identification engine, a plurality of chapters in a recording of a video conference based on stored metadata of the recording, wherein each chapter is associated with a start timestamp and an end timestamp; storing identifiers of the plurality of chapters in association with the recording; receiving a user input requesting a portion of the recording of the video conference corresponding to a subset of the plurality of chapters; and providing, in response to the user input, the portion of the recording of the video conference.

In Example 31, the subject matter of Example 30 includes, wherein the chapter identification engine uses machine learning, wherein the chapter identification engine is trained based on portions of recordings viewed by one or more viewers and prompts, to the one or more viewers, to confirm a time in a viewed recording associated with a start timestamp or an end timestamp of a chapter.

In Example 32, the subject matter of Examples 30-31 includes, wherein the stored metadata comprises at least one of: an agenda of the video conference, text in presented slides, an identity of a speaker, words spoken by the speaker, or a part of a recording viewed by a viewer.

In Example 33, the subject matter of Examples 30-32 includes, wherein the stored metadata comprises stored data related to users requesting the recording and not participating in the video conference.

In Example 34, the subject matter of Examples 30-33 includes, the operations comprising: determining that a set of users viewed a given chapter of the plurality of chapters; and transmitting, to a device of a new user outside the set of users, a recommendation to view the given chapter based on a computed similarity score between the new user and at least one member of the set of users.

In Example 35, the subject matter of Examples 30-34 includes, wherein providing the portion of the recording comprises providing a graphical user interface icon to view the portion of the recording, the method further comprising: determining whether a user providing the user input has permission to download the portion of the recording; and if the user has permission to download the recording: providing a graphical user interface icon to download the portion of the recording.

In Example 36, the subject matter of Examples 30-35 includes, wherein the chapters in the plurality of chapters are mutually exclusive.

Example 37 is an apparatus, comprising: a memory; and a processor configured to execute instructions stored in the memory to: identify, using a chapter identification engine, a plurality of chapters in a recording of a video conference based on stored metadata of the recording, wherein each chapter is associated with a start timestamp and an end timestamp; store identifiers of the plurality of chapters in association with the recording; receive a user input requesting a portion of the recording of the video conference corresponding to a subset of the plurality of chapters; and provide, in response to the user input, the portion of the recording of the video conference.

In Example 38, the subject matter of Example 37 includes, wherein the chapter identification engine uses a deep neural network, wherein the chapter identification engine is trained based on portions of recordings viewed by one or more viewers and prompts, to the one or more viewers, to confirm a time in a viewed recording associated with a start timestamp or an end timestamp of a chapter.

In Example 39, the subject matter of Examples 37-38 includes, wherein the stored metadata comprises text in presented slides, wherein the text is identified using optical character recognition.

In Example 40, the subject matter of Examples 37-39 includes, wherein the chapters in the plurality of chapters are collectively exhaustive.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
receiving an invitation to a video conference by a device of a proposed participant of the video conference;
providing, via a display of the device and based on the invitation, a graphical user interface element comprising a first graphical user interface icon for accepting the invitation, a second graphical user interface icon for rejecting the invitation, and a third graphical user interface icon for requesting a recording of the video conference, the first graphical user interface icon, the second graphical user interface icon, and the third graphical user interface icon being displayed simultaneously within the graphical user interface element;
receiving, by the device, a selection of the third graphical user interface icon;
transmitting, by the device, a signal requesting the recording based on the selection;
receiving, by the device at a first time after the recording is available, a first message indicating that the recording is available, wherein the recording is divided into one or more chapters based on stored metadata of the recording and based on stored information associated with user accounts requesting the recording; and
receiving, by the device at a second time after the first time, a second message comprising a recommendation, based on the proposed participant, of at least one chapter of the recording.

2. The method of claim 1, wherein the recommendation is based on a similarity score calculated between a user account associated with the proposed participant and an other user account.

3. The method of claim 1, wherein the signal requesting the recording is transmitted with at least one of an indication of acceptance of the invitation or an indication of rejection of the invitation.

4. The method of claim 1, wherein the invitation comprises a calendar invite, and wherein at least one of the first graphical user interface icon, the second graphical user interface icon, or the third graphical user interface icon comprises a hyperlink.

5. The method of claim 1, wherein the graphical user interface element comprises a fourth graphical user interface icon for tentatively accepting the invitation, wherein the fourth graphical user interface icon is displayed simultaneously with the first graphical user interface icon, the second graphical user interface icon, and the third graphical user interface icon.

6. The method of claim 1, wherein the graphical user interface element comprises at least one of: an identifier of an entity transmitting the invitation, an identifier of a subject of the video conference, or an identifier of a time of the video conference.

7. The method of claim 1, wherein the third graphical user interface icon comprises an on-screen button for selection by touching a touchscreen or clicking a mouse.

8. The method of claim 1, wherein the signal requesting the recording is a message sent to a host of the video conference.

9. The method of claim 1, wherein the signal requesting the recording is automatically granted and causes the video conference to be recorded.

10. The method of claim 1, wherein the signal requesting the recording is sent to a server that grants or denies the requesting the recording based on rules specified by a host.

11. The method of claim 1, further comprising:
receiving, by the device after completion of the video conference, a message indicating that the recording is available when the proposed participant is preauthorized to access the recording; or
receiving, by the device after completion of the video conference, a message indicating the recording was completed but access is not available without authorization of a host.

12. The method of claim 1, wherein the signal requesting the recording specifies a chapter of the video conference to be recorded, and wherein only the chapter of the video conference is recorded based on the signal.

13. The method of claim 12, wherein the chapter is specified based on one or more of a speaker identity, an agenda of the video conference, or a subject of a discussion corresponding to a transcript of the video conference.

14. The method of claim 1, further comprising:
receiving, by the device, an indication of a number of required requests to automatically grant the recording request; and
receiving, by the device, an indication of a number of requests for the recording received.

15. One or more non-transitory computer readable media storing instructions operable to cause one or more processors to perform operations comprising:
receiving an invitation to a video conference by a device of a proposed participant of the video conference;
providing, via a display of the device and based on the invitation, a graphical user interface element comprising a first graphical user interface icon for accepting the invitation, a second graphical user interface icon for rejecting the invitation, and a third graphical user interface icon for requesting a recording of the video conference, the first graphical user interface icon, the second graphical user interface icon, and the third graphical user interface icon being displayed simultaneously within the graphical user interface element;

receiving, by the device, a selection of the third graphical user interface icon;

transmitting, by the device, a signal requesting the recording based on the selection;

receiving, by the device at a first time after the recording is available, a first message indicating that the recording is available, wherein the recording is divided into one or more chapters based on stored metadata of the recording and based on stored information associated with user accounts requesting the recording; and receiving, by the device at a second time after the first time, a second message comprising a recommendation, based on the proposed participant, of at least one chapter of the recording.

16. The one or more non-transitory computer readable media of claim 15, wherein the recommendation is based on a similarity score calculated between a user account associated with the proposed participant and an other user account.

17. The one or more non-transitory computer readable media of claim 15, wherein the signal requesting the recording is transmitted with an indication of rejection of the invitation.

18. A system comprising:

memory hardware storing instructions; and one or more processors configured to execute the instructions to:

receive an invitation to a video conference by a device of a proposed participant of the video conference;

provide, via a display of the device and based on the invitation, a graphical user interface element comprising a first graphical user interface icon for accepting the invitation, a second graphical user interface icon for rejecting the invitation, and a third graphical user interface icon for requesting a recording of the video conference, the first graphical user interface icon, the second graphical user interface icon, and the third graphical user interface icon being displayed simultaneously within the graphical user interface element;

receive, by the device, a selection of the third graphical user interface icon;

transmit, by the device, a signal requesting the recording based on the selection;

receive, by the device at a first time after the recording is available, a first message indicating that the recording is available, wherein the recording is divided into one or more chapters based on stored metadata of the recording and based on stored information associated with user accounts requesting the recording; and receiving, by the device at a second time after the first time, a second message comprising a recommendation, based on the proposed participant, of at least one chapter of the recording.

19. The system of claim 18, wherein the recommendation is based on a similarity score calculated between a user account associated with the proposed participant and an other user account.

20. The system of claim 18, wherein the signal requesting the recording is transmitted with an indication of acceptance of the invitation or an indication of rejection of the invitation.

* * * * *